(12) United States Patent
Gross et al.

(10) Patent No.: US 11,700,137 B2
(45) Date of Patent: Jul. 11, 2023

(54) COLLABORATIVE ACCESS TO VIRTUAL DESKTOPS

(71) Applicant: VMware, Inc., Palo Alto, CA (US)

(72) Inventors: Adam Gregory Gross, Dexter, MI (US); Sean Samenfeld-Specht, Palo Alto, CA (US); Timotius Tjahjadi, Palo Alto, CA (US); Sandro Moiron, Palo Alto, CA (US); Ming Zhang, Palo Alto, CA (US); Haiou Jiang, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 85 days.

(21) Appl. No.: 15/875,855

(22) Filed: Jan. 19, 2018

(65) Prior Publication Data

US 2019/0068390 A1 Feb. 28, 2019

Related U.S. Application Data

(60) Provisional application No. 62/550,575, filed on Aug. 26, 2017.

(51) Int. Cl.
*H04L 12/18* (2006.01)
*G06F 9/451* (2018.01)
*H04L 65/4038* (2022.01)
*H04L 65/80* (2022.01)
*H04L 65/70* (2022.01)

(52) U.S. Cl.
CPC ......... *H04L 12/1827* (2013.01); *G06F 9/452* (2018.02); *H04L 12/1818* (2013.01); *H04L 12/1822* (2013.01); *H04L 65/4038* (2013.01); *H04L 65/70* (2022.05); *H04L 65/80* (2013.01)

(58) Field of Classification Search
CPC . G06F 9/452; H04L 12/1818; H04L 12/1822; H04L 12/1827; H04L 65/4038; H04L 65/607; H04L 65/80
See application file for complete search history.

(56) References Cited

U.S. PATENT DOCUMENTS

| | | | |
|---|---|---|---|
| 10,101,893 B1* | 10/2018 | van Doorn | G06Q 10/107 |
| 10,341,743 B1* | 7/2019 | Tanner | H04N 5/23219 |
| 10,705,690 B1* | 7/2020 | Mehta | H04L 12/1822 |
| 11,165,755 B1* | 11/2021 | Qian | H04N 5/272 |
| 2004/0181579 A1* | 9/2004 | Huck | H04L 67/2842 709/248 |

(Continued)

*Primary Examiner* — Chris Parry
*Assistant Examiner* — Dixon F Dabipi (57) ABSTRACT

A system is described for collaborative access to a virtual desktop through separate remote client devices. An owner of the virtual desktop can initiate a session with the virtual desktop through a client on her client device. The owner can request through her client to create a collaborative session, identifying one or more collaborators. Links for joining the virtual desktop can be generated and an invitation can be sent to each collaborator. A collaborator can accept the invitation and a client application can be launched on the collaborator's client and routed to the virtual desktop. Once authorized, collaborators can be connected to the virtual desktop session. Each collaborator in the session may view the GUI of the virtual desktop in her client application. Input control can be managed and delegated to collaborators by the owner of the session.

20 Claims, 6 Drawing Sheets

(56) References Cited

U.S. PATENT DOCUMENTS

| | | | | |
|---|---|---|---|---|
| 2004/0221010 | A1* | 11/2004 | Butler | G06F 3/038 709/204 |
| 2007/0300165 | A1* | 12/2007 | Haveliwala | G06F 3/0482 715/810 |
| 2008/0320082 | A1* | 12/2008 | Kuhlke | H04L 12/1822 709/205 |
| 2010/0138744 | A1* | 6/2010 | Kamay | G06F 9/452 715/716 |
| 2010/0175004 | A1* | 7/2010 | Deep | H04L 12/1818 715/758 |
| 2011/0117886 | A1* | 5/2011 | Travis | H04W 68/00 455/412.2 |
| 2011/0209064 | A1* | 8/2011 | Jorgensen | G06F 9/54 715/733 |
| 2011/0224811 | A1* | 9/2011 | Lauwers | G06F 3/16 700/94 |
| 2012/0110576 | A1 | 5/2012 | Lin | |
| 2013/0018950 | A1* | 1/2013 | Narayanan | H04L 65/403 709/204 |
| 2013/0212576 | A1* | 8/2013 | Huang | G06F 9/45558 718/1 |
| 2013/0238775 | A1* | 9/2013 | Taguchi | G06F 9/45558 709/223 |
| 2014/0068718 | A1 | 3/2014 | Mureinik | |
| 2014/0229934 | A1* | 8/2014 | Larkin | G06F 8/65 718/1 |
| 2015/0113528 | A1* | 4/2015 | Kim | G06F 9/45558 718/1 |
| 2015/0134737 | A1* | 5/2015 | Albrecht | H04L 51/52 709/204 |
| 2015/0288672 | A1* | 10/2015 | Patten | H04L 63/08 726/28 |
| 2016/0024358 | A1* | 1/2016 | Zambova | C08L 83/04 361/709 |
| 2016/0127432 | A1* | 5/2016 | Privat | H04L 65/403 709/204 |
| 2016/0247123 | A1* | 8/2016 | Holst | G06Q 10/1095 |
| 2016/0378534 | A1* | 12/2016 | Oh | G06F 9/45558 718/1 |
| 2017/0139738 | A1* | 5/2017 | Kim | G06F 9/45558 |
| 2018/0060572 | A1* | 3/2018 | Singleton | G06F 21/53 |

* cited by examiner

COLLABORATIVE ACCESS TO VIRTUAL DESKTOPS

CLAIM OF PRIORITY

This Application claims priority to and benefit of U.S. Provisional Application No. 62/550,575 filed Aug. 26, 2017, entitled "COLLABORATIVE ACCESS TO VIRTUAL DESKTOPS", by Adam Gregory Gross et al., the disclosure of which is incorporated by reference herein in its entirety.

TECHNICAL FIELD

The present disclosure generally relates to virtual desktop infrastructure and more specifically to techniques for allowing multiple users to collaboratively access a virtual desktop through separate remote client devices.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktop and all of the application execution takes place on the remote host server that is linked to the local client device over a network using a remote display protocol, such as remote desktop protocol (RDP), PC-over-IP protocol (PCoIP), VMware Blast, virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

With today's technology, when an owner of a virtual desktop desires to collaborate on her virtual desktop with other users, for example to allow each collaborator to view the virtual desktop and to produce inputs such as moue or keyboard inputs in the virtual desktop, the owner generally must take the same steps on her virtual desktop as she would if she were using a regular locally executing desktop. This may involve installing collaboration software in the virtual desktop and on each collaborating device, and executing the software every time a collaborative session is desired. Examples of such software are WebEx, available from Cisco WebEx, and GoToMeeting, available from Citrix Systems, Inc. However, using such additional collaborative software may produce a user experience that is not seamless and can impose various inconveniences on the users. For example, a user desiring to start or join a collaborative session may need to install the software (if it is not already installed), execute the software each time a collaborative session is initiated or joined (which may take time), and interface with the separate interface of the software throughout the process. All of this can lend to a less than optimal user experience. Further, such separate collaboration software can carry other burdens such as consumption of computing resources, licensing costs, information technology (IT) department overhead, and so on.

A more efficient approach is desirable for providing collaborative access to virtual desktops.

DETAILED DESCRIPTION

Systems and methods in accordance with various embodiments of the present disclosure overcome at least some of the above-mentioned shortcomings and deficiencies by providing more efficient ways to enable collaborative access to virtual desktops. In particular, embodiments described herein provide ways to leverage virtual desktop infrastructure to provide seamless and efficient ways for users of the virtual desktop environment to collaborate on a virtual desktop via separate remote client device.

The process can begin by a primary user or "owner" of a virtual desktop logging into her virtual desktop through a virtual desktop client application running on the owner's client device to establish a virtual desktop session. Once logged in, the owner can select to invite other users to collaborate on the virtual desktop by identifying those users and prompting the system to invite them to join the virtual desktop session. The system can then generate a link to the virtual desktop for each identified collaborator and send an invitation (e.g., via email or instant message) to each collaborator containing the link and a message inviting the collaborator to join the owner's virtual desktop session.

Once a collaborator receives the invitation on the collaborator's client device, the collaborator can accept the invitation and follow the link, which can automatically launch a virtual desktop client application on the collaborator's client device and, after performing any required user authentication procedures, the client application can connect to the virtual desktop via the provided link thereby joining the collaborator to the virtual desktop session.

In this way, the owner is able to invite and bring in any number of collaborators to join the owner's virtual desktop session. The graphical user interface (GUI) of the virtual desktop can be streamed to each connected collaborator's client application so that the collaborators are able to view the virtual desktop on their clients. Other outputs (e.g., sound) can likewise be conveyed from the virtual desktop to each collaborator. As will be discussed in more detail below, different approaches can be implemented for controlling how the users are able to collaboratively produce inputs (e.g., mouse and keyboard inputs) in the virtual desktop. In an embodiment, inputs into the virtual desktop can initially be allowed only from the owner. The owner can then delegate the inputs to any users via a dashboard in the owner's UI, at which point the virtual desktop can accept inputs from the chosen collaborator and the owner's inputs might no longer be allowed into the virtual desktop. The owner can be permitted to forcefully take back input control from the collaborator (i.e., without the controlling collaborators consent). A collaborator that desires to have input control may also be permitted to request control, which can be granted upon the owner's approval. The session owner can also choose to disconnect any particular collaborator or all collaborators simultaneously when finished.

Numerous advantages are realized as a result. For example, the system can be integrated with the same components and systems that are already present in virtual desktop infrastructure to enable the collaborative session access feature. In an enterprise environment, the virtual desktop infrastructure may already be present and each collaborator may already have virtual desktop clients installed on his or her device. This eliminates the need for installing, using, and maintaining additional pieces of software for enabling collaboration such as traditional collaborative software suites.

Further, because the system can utilize the VDI platform for performing complex and demanding functions that are critical to the quality of service, such as the remoting of display information and transfer of user inputs, a better user experience may be achieved by leveraging VDI than with traditional standalone collaborative software suites. In many cases, enterprises maintain complex and powerful VDI deployments to provide users a native-like experience when using their remote desktops. Because the described system can piggyback on these VDI deployments to carry out functions such as display remoting, conveying inputs, etc., a higher level of quality of service may be achievable than with the standalone collaborative software suites that attempt to provide all of these functions anew. For example, when using the described system, each collaborator may be able enjoy the same quality of user experience when accessing the collaborative desktop as when using her own personal remote desktop because the same infrastructure can be implemented in both cases. In comparison, users of a traditional standalone collaborative software suite that does not implement the robust remoting capabilities of VDI may experience poor responsiveness, interruptions, and lower quality.

Lastly, the described system provides a more seamless user experience than traditional collaborative software suites. For example, unlike traditional collaborative software, the system does not require execution of and interfacing with separate software for carrying out a collaborative session. An owner who is using a virtual desktop can simply navigate through the UI of the desktop client and elect to invite collaborators, who can join via virtual desktop clients on their respective client devices.

Figure 1:
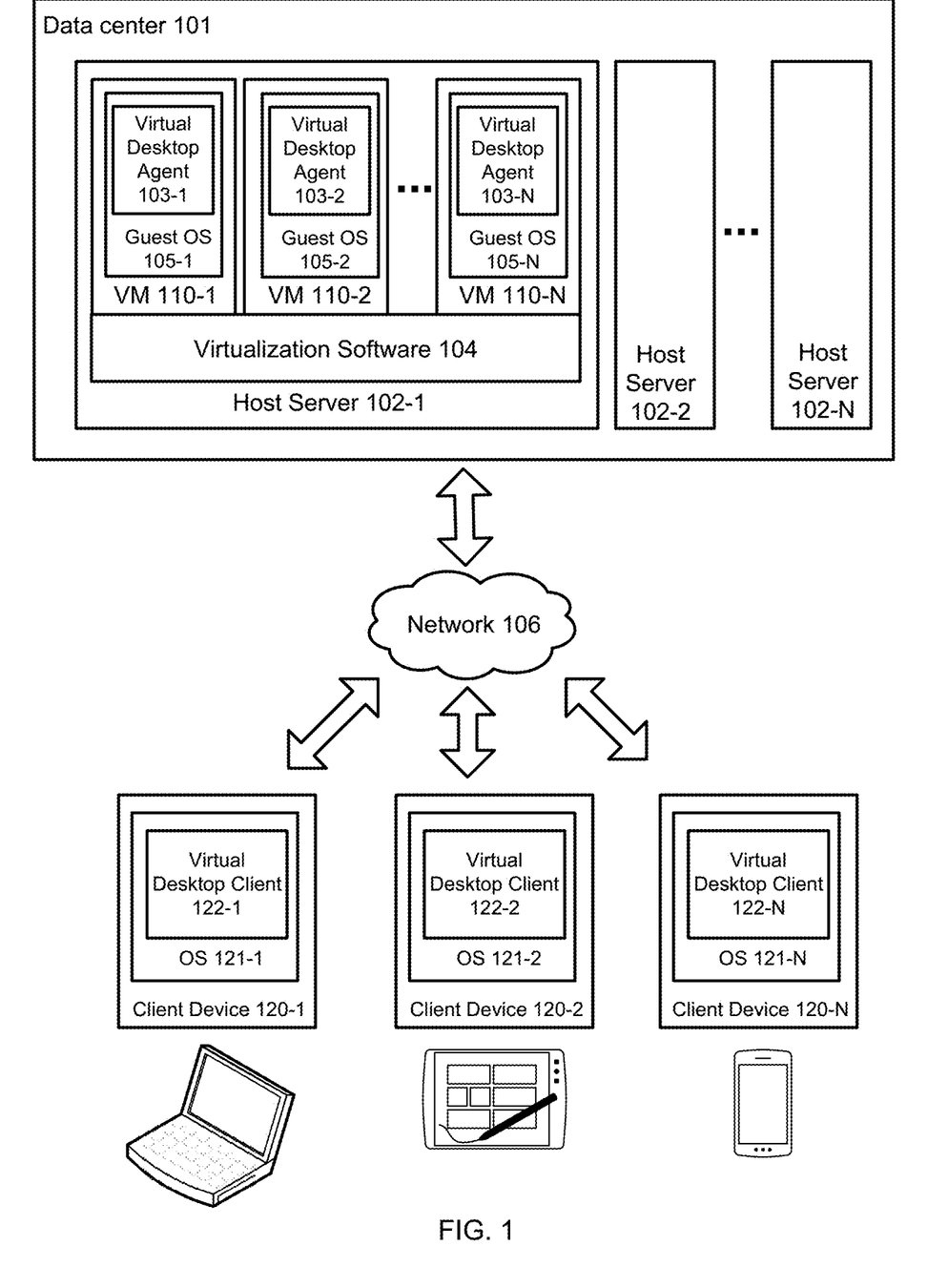
FIG. 1 illustrates an example of a virtual desktop environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent. Interactions between the virtual desktop client (e.g., 122-1, 122-2, 122-N) and the virtual desktop agent (e.g., 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast, virtual network computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
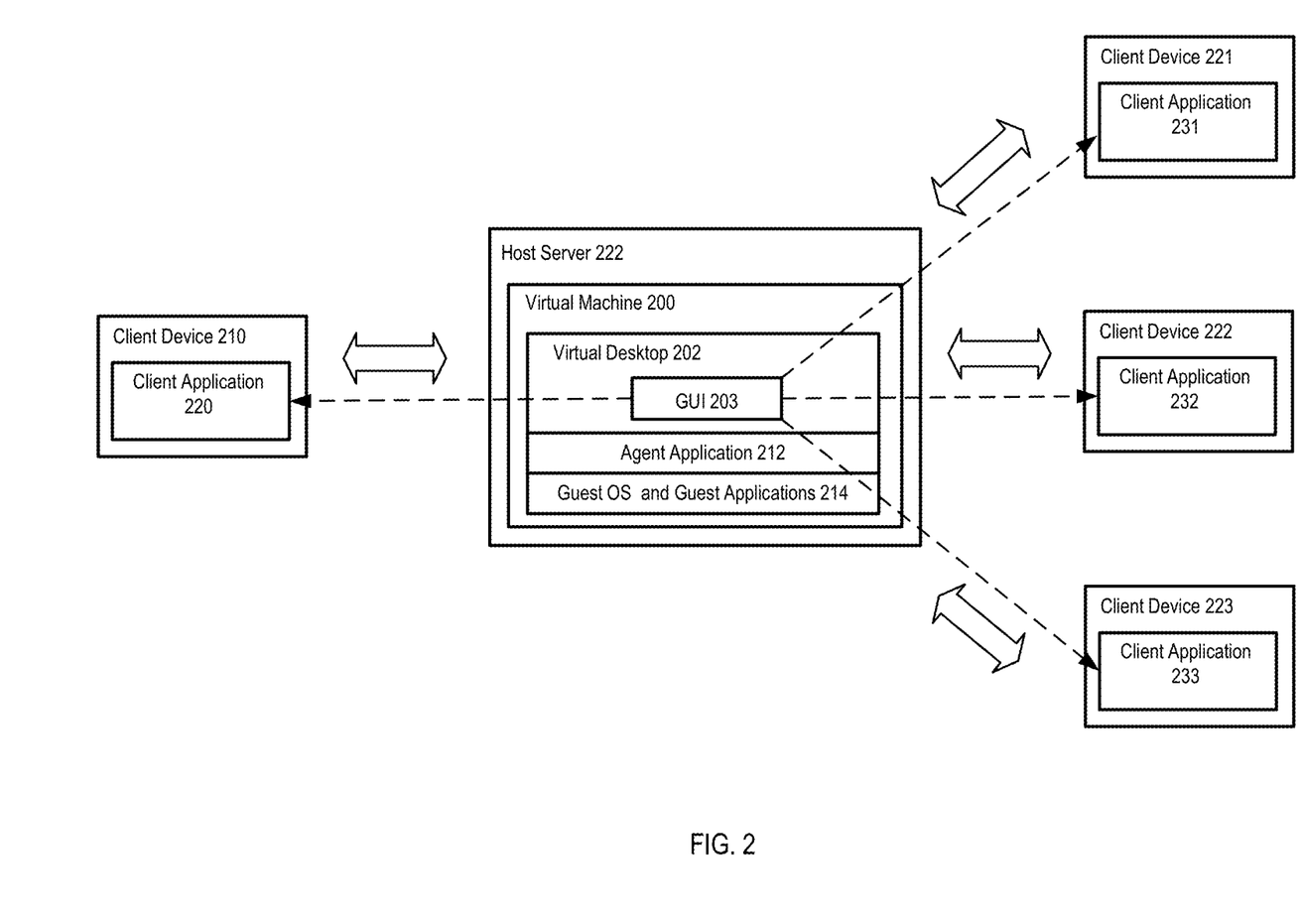
FIG. 2 illustrates an example diagram of a system for providing collaborative access to a virtual desktop.

FIG. 2 illustrates an example diagram of a system for providing collaborative access to a virtual desktop. As illustrated, a client device 210 can be communicatively linked, e.g., over a network such as the Internet or a local area network (LAN), to a virtual machine 200 residing on a host server 222, which may reside inside an on-premises datacenter or a datacenter of a third-party service provider. A guest operating system (OS) and guest applications 214 may be executing in the VM 200 to produce a virtual desktop 202. A user of the client device 210 or "owner" can interact with the virtual desktop 202 via a client application 220, which may be a native client application (such as the VMware Horizon Client Application, available from VMware, Inc.), running on the client device 210 that communicates with an agent application 212 in the virtual machine 200. The host server 222 authenticates users and takes requests for desktop sessions, orchestrating a secure direct protocol connection from the client 220 to the agent 212.

User inputs, such as keyboard and mouse inputs, produced in the client application 220 can be transmitted by the client application 220 to the agent 212 based on a remoting protocol, and the agent can inject the inputs into the virtual desktop 202 to effectuate them. Outputs of the virtual desktop 202, such as the GUI 203 of the virtual desktop 202, can be transmitted by the agent 212 to the client device 210 (as illustrated by the broken area from the GUI 203 to the client 220) based on the remoting protocol and displayed in the client application 220. Other outputs, such as audio, can likewise be conveyed to the client 220. In this way, a user of the client device 210 may be able to interact with the virtual desktop 202 as if it was executing locally on the client device 210 while execution actually takes place in the remote VM 200.

In various embodiments, a user or "owner" of the virtual desktop 202 can initiate a virtual desktop 202 session by executing the client application 220 and authenticating herself with the server 222 (e.g., by providing a login ID and a password). The desktop session can be established and the owner's client 220 can be connected to the virtual desktop 202, as indicated by the double-sided arrow between the desktop 202 and client 220. For example, the connection between the client 220 and the virtual desktop 202 can be a remoting protocol session.

Consequently, other users can be invited to connect to the virtual desktop as collaborators. For example, users can be invited by sending an invitation (e.g., via email, instant message, etc.) containing a link to the virtual desktop 202 to each users' client devices (e.g., 221, 222, 223). The link can comprise information for routing to the virtual desktop 202, such as the desktop's 202 address on the local network or on a WAN (such as a URL). The collaborators' client devices 221, 222, 223 can be any client devices that are communicatively linked over a network to the server 222. For example, the collaborator devices 221, 222, 223 may be located on the local enterprise network or they may be located more remotely and connected over the Internet.

As will be described in more detail below, the owner can prompt the system (e.g., via the agent 212) to send an invitation to a set of identified users via an option in a UI in the client 220. The system (e.g., the agent 212) can send the invitation to each client device 221, 222, 223 in response to the received instruction from the client 220 to initiate the collaborative session with the users. In other embodiments, invitations can be sent to the collaborator devices 221, 222, 223 in other ways, e.g., from the client device 210.

Once a collaborator client device 221, 222, 223 receives the invitation, the user of the client device 221, 222, 223 may accept the invitation, e.g., by clicking on the link in the email, IM, etc. When the collaborator accepts the invitation or clicks on the link, the client device 221, 222, 223 can automatically launch a virtual desktop client application 231, 232, 233 and connect to the virtual desktop via the supplied link. Because client applications such as 231, 232, 233 may be usable for purposes other than collaborative virtual desktop access, such as for accessing the collaborators' own virtual desktops (not pictured), the applications 231, 232, 233 may have already been installed on the collaborator client devices 221, 222, 223. In some embodiments, when a client device (e.g., 221, 222, 223) that does not have a virtual desktop client application installed receives an invitation, the client device can automatically download and install the client application (e.g., after prompting and receiving approval from the user) and the installed client can then proceed with establishing a connection with the virtual desktop 202. Also, each invitation message can contain a download link for the virtual desktop client application, which the invitee can select to launch a download of the client application if he or she does not have a client installed.

Once a collaborator's client 231, 232, 233 is launched and routed to the virtual desktop 202, prior to allowing connection, the host server 222 can authenticate each collaborator (e.g., by requesting a username and password, fingerprint, or however else authentication may be set up). In various embodiments, the same mechanisms can be used for connecting collaborators to the shared desktop as implemented in standard virtual desktop connections between a client and a virtual desktop (i.e., without collaboration). For example, the connection between each collaborator's client 231, 232, 233 and the virtual desktop 202 can be a separate remoting protocol session, while the owner's client 220 can also be connected to the virtual desktop 202 via its own separate remote deskop protocol session.

To clarify, as used herein in various embodiments, the terms "virtual desktop session" or "desktop session" refer to a running instance of the virtual desktop (e.g., 202) in the virtual machine 200 (e.g., a Windows session). Each client (e.g., 220, 231, 232, 233) can connect to the virtual desktop (e.g., 202) via a separate remoting protocol session. Hence, during collaboration, clients (e.g., 220, 231, 232, 233) can share or connect to the same virtual desktop session, each via its own unique connection or remoting protocol session.

After the collaborative clients 231, 232, 233 are authorized by the server, a connection can be established between each client 231, 232, 233 and the virtual desktop 202, as indicated by the double-sided arrows pointing to the client devices 231, 232, 233. The GUI 203 of the virtual desktop can be streamed to each client 231, 232, 233 via the corresponding connection. As will be discussed in further detail below, this can be performed by establishing a separate encoder for each collaborative client 231, 232, 233, and having the separate encoders encode the GUI 203 and transmit it to the corresponding client 231, 232, 233. In other implementations, more than one client (e.g., 231, 232, 233) can share a given encoder.

As a result, each collaborative client 231, 232, 233 may be able to display the GUI 203 of the virtual desktop 202 so the participants of the collaborative session are able to view the GUI 203 on their devices 221, 222, 223. Further, to enable active collaboration, various techniques can be implemented to allow the owner as well as each invited user to produce inputs in the desktop 202, such as mouse and keyboard inputs. For example, input control can be shared among the users, such that inputs from more than one of the clients 220, 231, 332, 233 are allowed into the virtual desktop 202 at the same time. In other embodiments, input control can be passed around, such that inputs from only one of the clients 220, 231, 332, 233 are allowed into the virtual desktop 202 at any given time.

In various embodiments, the owner can be given authority to select (via a dashboard UI) which user or users have input control at any given time. The owner may be able to grant or take back such control at any point. In other embodiments, a collaborator may be able to request input control and receive control when the owner consents.

The system can control which clients (e.g., 220, 231, 332, 233) are permitted to produce inputs in the desktop 202 in a variety of ways. In an embodiment, the agent 212 can receive inputs from each collaborator's client (as well as from the owner's client) and decide which input to process. If the desktop session owner gives input control to a collaborator, the agent 212 can process the input from that specific collaborator while ignoring inputs from others (including the session owner).

For example, each client 220, 231, 332, 233 may be permitted to convey inputs to the virtual desktop 202 in the same way as in a standard, non-collaborative VDI session (i.e., each client 220, 231, 332, 233 may believe that it has input control); however, the agent 212 can mute inputs from clients 220, 231, 332, 233 that it is instructed do not have input control, and permit inputs from clients that it is instructed do have input control. In this way, a standard VDI connection can be implemented between the virtual desktop 202 and each client 220, 231, 332, 233 (i.e., with screen data flowing to the clients 220, 231, 332, 233 from the desktop 202 and inputs flowing in the opposite direction from the clients 220, 231, 332, 233 to the desktop 202) while the agent 212 selectively determines which clients' 220, 231, 332, 233 inputs to mute and which clients' 220, 231, 332, 233 inputs to permit. In addition, the owner can have the option to shut down the connection with either collaborative client (e.g., 231, 232, 233) to kick them off, to cancel the collaboration and shut down all the collaborative connections but not the owner's connection, or to simply terminate all connections with the desktop 202, such as by simply logging off.

In various embodiments, the UI in the client application 231, 232, 233 of the collaborators can contain certain differences from the UI in the client application 220 of the owner. For example, certain features can be disabled in the UI displayed to the collaborators, such as features that would not be rationally needed for the collaborators. For example, in an embodiment, the ability to log out of the virtual desktop or to disconnect can be blocked for collaborators in the UI (to prevent a collaborator from logging out and forcing everyone out of the virtual desktop session).

User Experience

Figure 3A:
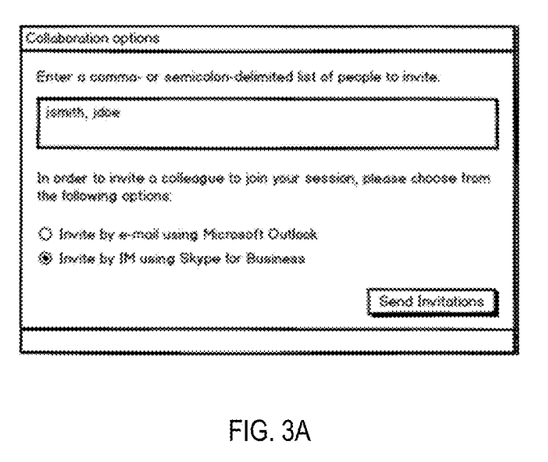
FIG. 3A illustrates an example of an invitation UI, in accordance with various embodiments.

As mentioned, after establishing the virtual desktop 202 session, the session owner (i.e., the user of the client device 210) can select to invite other users to collaborate on the virtual desktop. For example, the agent application 212 can provide an invitation UI that can be displayed in the client 220, which the owner can bring up at any point during the session (e.g., by clicking on a button or a menu item labeled "collaborative session" or the like in the client 220). The invitation UI can give the owner the option to invite participants and form a collaborative session. Such an invitation UI may include a dialog box that allows the owner to identify a list of desired collaborators. The invitation UI may also allow the owner to choose how the collaborators should be invited (e.g., via email, instant message (IM), or otherwise). FIG. 3A illustrates an example of an invitation UI, in accordance with various embodiments.

In an enterprise setting, for example, the owner may be able to invite anyone on a domain that the server 222 allows for authentication. The agent 212 can automatically determine whether an e-mail and/or IM client is installed for a given invitee by querying the system; for example, by looking up the default handlers for the mailto:// and im:// schemas, and extract the binary name, hiding an option if there are no registered handlers for its respective schema.

Once the owner selects to send the invitation, one invitation message per collaborator can be automatically generated using the mechanism the owner specified. At a technical level, this can be done by formatting and launching the appropriate mailto:// or im:// URI (see RFCs 3860 and 2368 for the specifics).

Figure 3B:
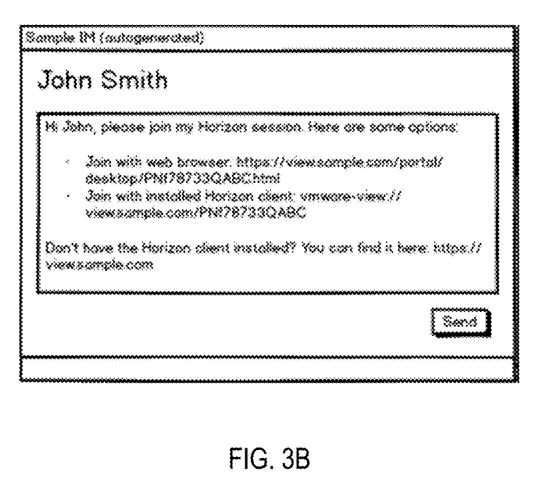
FIG. 3B illustrates an example of an instant message inviting a user to join a collaborative session, in accordance with various embodiments.

FIG. 3B illustrates an example of an instant message inviting a user to join a collaborative session, in accordance with various embodiments. This example is based on the VMware Horizon View desktop-virtualization product, available from VMware, Inc. Hence, the user is being asked to join the Owner's "Horizon session". As illustrated, the user can be given a link to join via a web client, and a different link to join via a native client. The user can also be provided with a link for downloading the native client at the user's option, in case the user doesn't have one installed.

Figure 3C:
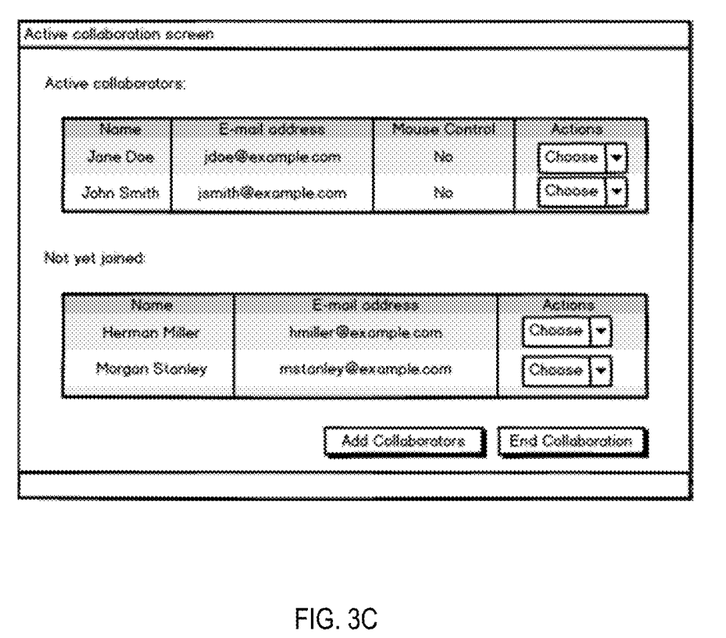
FIG. 3C illustrates an example of a dashboard UI, in accordance with various embodiments.

After the initial invitations are sent, the invitation UI illustrated in FIG. 3A can turn into a dashboard UI that shows the current state of the collaborative session and allows the owner to take certain actions with respect to the session and with respect to each collaborator. FIG. 3C illustrates an example of a dashboard UI, in accordance with various embodiments. Via such a UI, the owner can take actions such as to invite additional collaborators (by clicking on the "Add Collaborators" button, or end the overall collaboration session, disconnecting all active collaborators and revoking all invitations (by pressing the "End Collaboration" button).

The owner can also be given the option to perform various actions on individual collaborators by expanding the "Actions" pull-down menu for a particular collaborator and choosing an action. The actions available to the collaborative session owner can depend upon whether the target is active (i.e., on whether or not the target has joined). For example, for active targets, the available actions can include the ability to disconnect and revoke the target's invitation, or to grant keyboard and/or mouse control. For invited targets who have not joined, actions could include the ability to revoke the invitation, or to remind the target of its invitation by e-mail or instant message. In addition, certain parts of the UI can be disabled for the owner if a collaborator has been given control.

As mentioned above, the session owner may be able to transfer mouse and keyboard control to collaborators using the collaborative UI. In addition, collaborators may be able to specifically request mouse and keyboard access. Further, once a collaborator does have mouse and keyboard control, the session owner can be permitted to forcefully take control back (or to give it to another collaborator) when desired.

In various embodiments, a collaborator can request control of the session by clicking on the window showing the session (e.g., clicking on the client application 231, 332, 233 window). The collaborate can then be asked by the client 231, 332, 233 to confirm that he or she wants to ask the session owner for control. If the collaborator confirms, the collaborative session owner can be asked by the agent 212, e.g., via a prompt in a pop-up dialog box, to confirm that the owner wants to hand over control to the collaborator. If the owner confirms, he or she will no longer have control of the remote session. The session owner can also be permitted to take control back by clicking on the window showing the session (in the client 220), just as a collaborator may be able to request control in the first place. The owner can likewise be prompted to confirm that he or she desires to take control back (e.g., to avoid taking control in case of accidental clicks). However, if the session owner confirms that he or she wants to take back control, it can be given immediately (without seeking approval from controlling the collaborator).

Managing Collaboration

When a user invites participants to join his or her virtual desktop session as collaborators, the agent 212 can generate links to send to each of the collaborators. To generate these links, the agent 212 can obtain a server 222 URL and a token indicating the collaborative session to connect to. The agent 212 may already know the server 222 URL that the collaborative session owner used to connect to the virtual desktop 202 and for simple deployments that can be used. However, in some deployments, there may be multiple server 222 URLs (e.g. if an enterprise requires one server 222 URL on the corporate network and another for external access) and these can be retrieved, for example, either from the server 222 or from a group policy object (GPO) set by an administrator. If there are multiple server 222 URLs based on location, multiple links can be generated. A token specifying the collaborative session can be retrieved by having the agent 212 send a message to the server 222. Further, these links might not automatically authenticate and grant access to the user, to avoid potential information leakage.

Once a collaborator has received an invitation and uses the link, the collaborator can be automatically connected to the server 222 (i.e., the client application 231, 332, 233 can be connected) and be prompted to authenticate (e.g., by supplying a login ID and password, via fingerprint identification, etc.). After authentication, the user can be automatically connected to the collaboration session that he or she was invited to. If the user is separately entitled to other applications or desktops on the server 222, or has other active collaboration invitations, the user may be able to see those as well. In VMware Horizon VDI, the specific mechanism can use the existing <get-launch-items> XML-API message but with a new <shadow-sessions> tag that includes the list of tokens corresponding to all collaborative sessions that the user has been invited to. This can allow the View client (e.g., 231, 332, 233) to handle collaborative sessions separately from how it handles applications or desktops.

The server 222 can be responsible for managing the list of collaborative sessions. The agent 212 can send the list of invitees to the server 222, and the server 222 can remember that list. When those accounts are used to authenticate into the server 222 using the client 231, 332, 233, the server 222 can indicate in its response (e.g., <get-launch-items> response in the VMware Horizon VDI) that the collaborative session is available.

In various embodiments, the session owner's connection can control the remote desktop 202 session resolution. The collaborators can use that same resolution, with the client 231, 332, 233 optionally allowing them to scale their display of the session. Hence, if a collaborator's resolution doesn't match, the collaborator effectively can choose between seeing a scaled session and seeing a session that is smaller or larger than their displays, with scrollbars being shown in the latter case.

When the session owner decides that the collaborative session is finished, the owner can revoke access to all invited collaborators, effectively ending the collaborative session. This can also include any collaborators who were sent a link but have not connected. This can be implemented by having the agent 212 send a message to the server 222 indicating that all connections to the collaborative session should be terminated. Any internal bookkeeping that the server 222 is maintaining can be cleared and all collaborators can have their collaborative remoting protocol session disconnected. However, if collaborators had any separate connections to their own applications or desktops, or other collaborative sessions, those can be maintained.

Collaboration Architecture

In various embodiments, a component referred to as the "worker" can manage user session related activities, including dealing with input, encoding the desktop, and managing the data on the wire. In the VMware Horizon architecture on the Windows platform, this component is known as the Blast Worker. The worker can run a Virtual Network Computing (VNC) server, which can be responsible for sharing the desktop screen to the client. The worker can also be responsible for managing control of input between the owner and collaborators. For example, the worker can receive all input from all collaborative remoting protocol sessions and decide which input to process. If the session owner gives input control to a collaborator, the worker can process the input from that specific collaborator while ignoring inputs from others (including the session owner).

Remote computing protocols, such as the VMware Blast protocol, can rely on VNC extensions to run a standards-compliant VNC server while adding new functionality when a protocol (Blast) enabled client is connected. To manage screen contents, the VNC encoder can spawn multiple region encoders. As the name implies, the region encoder is given a region of the desktop to encode. The architecture can separate the desktop by screen, thus each screen can be one region. For instance, if a remote desktop session is using two monitors, then there will be two region encoders. Protocols such as Blast can support multiple region encoders: JPEG/ PNG, Software H.264, and Hardware H.264. The JPEG/ PNG encoder can use a combination of the JPEG/PNG encoding standards to encode the screen. Both the software and hardware H.264 encoders can use the H.264 standard for encoding. The worker can support both Transmission Control Protocol (TCP) and User Datagram Protocol (UDP) for the network connection and can run a multiplexer over the socket, referred to as VMware Virtual Channels (VVC). A virtual channel can be a mechanism with which modules running on the client and agent can communicate easily without having to worry about routing packets, establishing, or securing a connection. The display protocol can bundle this traffic as part of its connection, which can already be connected through a load balancer or external gateway if needed.

Certain complications can occur in cases where the owner has a different number of monitors than a collaborator. For example, if the owner has four monitors and a collaborator has two. To address such issues, in various embodiments the owner can be allowed to select a single monitor for sharing. Then, during the collaborative session, the other participants will only be able to view and participate in the single selected monitor. Hence, in such a case the collaborators will only have one region encoder while the owner can have multiple. In other embodiments, the number of shared monitors can be determined by the collaborator with the fewest number of monitors. For example, if the owner has four monitors and the collaborator with the fewest monitors in the group of collaborators has two, then two of the user's monitors (e.g., which the owner can select) can be used in the collaboration.

In general, to transmit the virtual desktop GUI 203 to a client (whether an owner or a collaborator), the GUI 203 data stream can be encoded in an encoder before it is conveyed to the corresponding client (e.g., 220, 231, 332, 233). Each such encoder can comprise regional encoders, as mentioned in the previous paragraphs, for example to provide a separate regional encoder for each monitor in cases where a client has multiple monitors. Hence, the term "regional encoder" should not be confused with the term "encoder".

As mentioned previously, the streaming of the virtual desktop GUI 203 to each collaborative client 231, 232, 233 can be performed by establishing a separate encoder for each client 231, 232, 233, and having the separate encoders encode the GUI 203 and transmit it to the corresponding clients 231, 232, 233. In other implementations, more than one client (e.g., 231, 232, 233) can share a given encoder.

Generally, when the owner establishes the virtual desktop session, an encoder (e.g., running in the worker) can receive GUI screen data from the virtual desktop, encode it, and convey it to the owner's client application. In the client, the GUI data can be decoded and displayed to the owner. In the case of the one encoder per collaborator architecture, when each new collaborator joins the session, a new encoder can be generated (e.g., in the worker) for the collaborator. Hence, each collaborator can be attached to its own encoder, and the encoder can encode the GUI screen data specifically for its attached collaborator and convey the data to the collaborator.

The one encoder per collaborator architecture offers numerous advantages. For example, because each collaborator and the owner has its own encoder, each encoder can be optimized for the corresponding collaborator or owner. For example, for each collaborator and for the owner, the system can determine factors such as the quality of the connection (e.g., is it a fast connection or a slow connection), the type of client device, the type of decoding hardware and/or software available on the client device, or any other factor that is relevant to the encoding and decoding of the streamed GUI to the client device. Based on these factors, an optimal encoder can be generated and used in the session.

Hence, by using separate encoders for each client in the collaborative session, if a collaborator or the owner has a poor connection and in turn receives an encoder that is optimized for such conditions (e.g., which may use lower image quality and lower frame rate to compensate for the poor connection), other devices that are connected to the desktop over superior connections will not be bound to using the same encoder as the system can generate separate encoders that are optimized to their corresponding conditions. Further, an encoder may be generated based on other factors not necessarily related to the quality of the connection and network conditions, such as factors related to device capabilities. For example, some clients can do hardware decoding of H264, while other clients such as web clients cannot. Hence, in these cases it is also preferable to generate separate encoders for different devices.

In various VDI platforms, such as the VMware Horizon platform, in the standard, non-collaborative scenario where a single client connects to a virtual desktop, the system generates an encoder based on various factors related to the client and the network, as described above. In various embodiments, such existing capabilities of VDI platforms can be used in the collaborative setting for generating encoders for each collaborating device.

A drawback of this approach can be additional computing resources required to process each collaborator. The approach thus can be limited in terms of how many simultaneous sessions it can handle, but it is expected to work well for small numbers of collaborators.

In various embodiments, instead of implementing the one encoder per collaborator architecture, multiple remoting protocol sessions can be coalesced into shared encoders. In this approach, two or more collaborators can share a single encoder. The encoder can encode the GUI screen data from the virtual desktop and stream the encoded data to each collaborator (and possibly the owner) that share the encoder. In an embodiment, the collaborators and the owner can all share one encoder.

In another embodiment, the collaborators and the owner can share more than one encoder. That is, some of the collaborators/owner can be assigned to one encoder, others can be assigned to a second encoder, others to a third encoder, and so on. In this schema, the system can maintain a set of different predefined encoders (e.g., four different encoders) and each collaborator/owner can be assigned to the encoder that is deemed to be the best match based on various characteristics. For example, the encoders can vary in quality from poor to high, such that clients with poor connectivity are assigned to the poor quality encoders (e.g., with low frame rate and poor image quality) and clients with good connectivity are assigned to the high quality encoders (e.g., with high frame rate and good image quality), while clients in the middle are assigned to the mid-range encoders accordingly. Encoders can likewise be specified for other factors, such as decoding capabilities. For example, an encoder can be specified for clients that can do hardware decoding of H264, and all such clients can be assigned to and share this encoder.

In an embodiment, the system (e.g., via the worker) can create encoders that map to predefined "quality" groupings. For example, it can use four total encoders for all collaborators, which can break down to:

1. Primary encoder assigned to the session owner
2. Highest quality encoder for users with strong connections
3. Average quality encoder for users with wide area network (WAN) connections
4. Low quality encoder for users with poor connections The primary encoder can operate as a standard VNC encoder, and can be assigned to the single client session running for the session owner. The three other predefined encoders can use different settings for each profile (e.g. 30 FPS with high image quality for the best connection and 12 FPS with low image quality for poor connections) and can multicast each encoder to all client connections.

In embodiments utilizing VNC and shared encoders, a technical challenge can arise from VNC being a lossless protocol that uses client acknowledgements (ACKs) to determine outstanding frames. When sharing an encoder, the system can bypass this so that one collaborator's bad connection doesn't degrade the others. For example, this can be done by having a proxy client that periodically ACKs the VNC messages based on the assumed quality of the encoder.

In various embodiments, the system can determine which encoder to use for each incoming connection and account for changing network conditions. One approach for achieving this can be to intelligently pick the initial encoder by running some quality tests while establishing the connection. If this initial handshake increases the connection time by an unacceptable amount, the system can initially place the user in a specific bucket (e.g. average or low) and then move the user accordingly as the session progresses. To support changing encoders during a session, this approach can implement a "pseudo" VNC encoder for each client connection. This pseudo encoder can have two roles: first, it can continuously evaluate the connection quality and; second, it can abstract away the current encoder to allow the system (e.g., the worker) to switch a user's active encoder without disconnecting and reconnecting the protocol connection.

In embodiments utilizing VNC, additional considerations should be taken into account for managing inputs (e.g., mouse and keyboard inputs) of collaborators on a shared encoder into the virtual desktop. Because a standard VNC encoder also processes client input, inputs from all assigned collaborators can flow to the shared VNC encoder. In various embodiments, collaborator inputs in such shared encoder scenarios can be managed so that inputs are properly routed (e.g., to ignore inputs from collaborators without control and accept inputs from collaborators with control). Various mechanisms can be used to achieve this. For example, all connections to the shared encoders may be made passive, e.g., so that the connections cannot receive session control or transmit input to the virtual desktop. Then, when a user is granted session control, the user can be moved to a dedicated VNC encoder where the user has session control. When control is revoked, the user can be moved back to the appropriate shared encoder.

An additional approach to allow a high number of collaborators can be to use a media server to transcode the session for users. This architecture can transition client connections to a more traditional media streaming approach, as opposed to the desktop session. Instead of all client connections going to a VNC encoder, some would end at the media server.

The media server could either run on the same VM as the remote desktop or in a separate VM. The media server can connect to the remote session as a client connection, but can take the desktop session and transcode it for other clients. This can allow the system to scale the resolution, drop frames, buffer, and many other things that are difficult or impossible for desktop session streaming.

Some features in remote desktops, such as support for USB devices, can use virtual channels. In various embodiments, collaborators in a session may be entitled to a more limited feature set enabled by virtual channels than the owner. The collaborative session owner may continue to have support for all features in the collaborative session that he or she would regularly receive. For example, suddenly losing support for attached USB devices after inviting collaborators could be a catastrophic problem. Collaborators, on the other hand, might be allowed a more restricted feature set. For example, collaborators might not be permitted to attach their own USB devices to the remote session.

Nonetheless, limited virtual channel feature support for collaborators may improve the overall user experience and hence can be enabled for collaborators in some embodiments. In various embodiments, virtual channels can be allowed from collaborators, some can be disallowed, and/or some can be modified to be collaboration-aware. For example, the latter case can be important as some virtual channels may need to operate in a read-only mode in which they avoid making changes to a remote session.

An example of a feature that relies on a virtual channel, which may be desirable if supported in collaborative sessions, is the Unity feature in the VMware Horizon platform. The Unity feature improves overall user experience by presenting individual remote application windows as though they are native applications on the client. In various embodiments, to support this feature for collaborative sessions, the feature can be made aware of whether the collaborator has session control. Unity normally allows clients to make window changes, including window move, resize, close, etc. These operations can be limited for clients without session control. On the client side, certain features such as client-driven window operations can be disabled for session observers to avoid confusion; otherwise, they would think that they could move or resize a window but then when they finished the request, the window would snap back to its previous position. On the agent side, certain remote procedure calls (RPCs) can be rejected for session observers. This can all be dynamically based on whoever has control of the session; if mouse and keyboard control is handed to a certain collaborator, the collaborator's Unity virtual channel should be free to move and resize windows as needed. But when the collaborator no longer has control of the session, he or she should no longer be able to make these window changes.

In various embodiments, the collaborative feature described herein can be implemented for performing session recording; e.g., for recording a virtual desktop session into a video file. In this implementation, a video specific encoder can be generated by the agent (e.g., an agent such as agent 212 in FIG. 2), or by the worker in the agent. The encoder in this case can be optimized for recording video. Modern remoting desktop protocols, such as the Blast display protocol, can transfer frames in a variety of modes, including H264, JPEG, and PNG. The encoder can be configured to transfer the virtual desktop GUI screen data in whatever mode is desired for optimal video recording/viewing.

Instead of transmitting the frames to a client device, the frames can be dumped into a video file for on-demand session recording.

There are several benefits derived from linking session recording to the collaboration feature. First, the characteristics of the encoder can be customized for the session recording feature, completely separating its frame rate and method of encoding from the performance of the primary session. For example, if the primary session owner is using the PNG encoder and is on a high-latency connection that is giving only 10-15 frames per second, using a secondary encoder to record the session onto a local video file can allow recording the session using an H264 encoding (preferred due to a better compression ratio and better general acceptance among video players) with a full 24 frames per second, in spite of the poor quality of the primary session.

Figure 4:
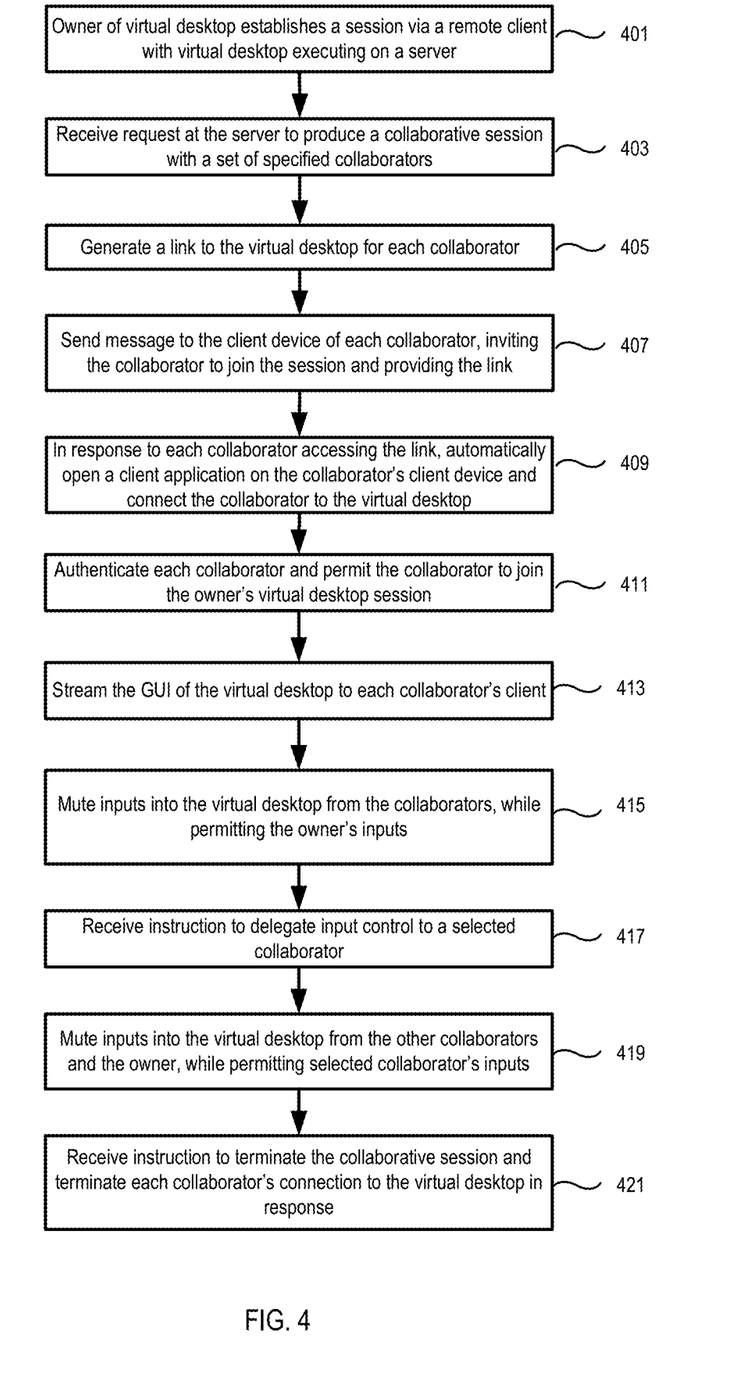
FIG. 4 illustrates an example process flow for collaborative access to a virtual desktop, in accordance with various embodiments.

FIG. 4 illustrates an example process flow for collaborative access to a virtual desktop, in accordance with various embodiments. In operation 401, the owner of a virtual desktop establishes a session via a remote client with a virtual desktop executing on a server. For example, the owner may log into the virtual desktop through a client application executing on the owner's client device. In operation 403, a request is received at the server to produce a collaborative session with a set of specified collaborators. For example, the owner might request the collaborative session with the specified collaborators through the UI of the owner's client. In operation 405, a link to the virtual desktop is generated for each collaborator. In operation 407, a message is sent to the client device of each collaborator, requesting the collaborator to join the session and providing the link. In operation 409, each collaborator accesses the link and in response to the access a client application is automatically opened on the collaborator's client device and the collaborator is connected to the virtual desktop.

In operation 411, each collaborator is authenticated and is permitted to join the owner's virtual desktop session. In operation 413, the GUI of the virtual desktop is streamed to each collaborator's client. For example, a separate encoder can be generated in the server for each collaborator's client, and the encoders can stream the GUI to the corresponding clients. In operation 415, inputs into the virtual desktop from the collaborators are muted, while the owner's inputs are permitted. In operation 417, an instruction is received to delegate input control to a selected collaborator. For example, the instruction can be generated by the owner making a selection to delegate input in the owner's client UI. In operation 419, inputs into the virtual desktop from the other collaborators and the owner are muted, while the selected collaborator's inputs are permitted. In operation 421, an instruction is received to terminate the collaborative session and each collaborator's connection to the virtual desktop is terminated in response to the instruction. For example, the instruction can be generated by the owner making a selection to end collaboration in the owner's client UI.

In various embodiments, the system for collaborative access to virtual desktops can be implemented in cloud pod architecture, such as the Cloud Pod architecture available from VMware, Inc. In cloud pod architecture (such as in the VMware, Inc. Cloud Pod architecture) multiple pods (e.g., VMware, Inc. View pods) can be linked together to provide a single large desktop brokering and management environment. In this setting, a pod can refer to a separate deployment including a set of connection server instances (such as VMware, Inc. View Connection Server instances), shared storage, a database server, a hypervisor (such as VMware, Inc. vSphere), and network infrastructures required to host desktop virtual machines. For example, separate pods may be implemented by an enterprise in separate datacenters. An enterprise may have separate pods for hosting desktop virtual machines in geographically distinct areas. In a traditional implementation, each pod is managed independently. With the cloud pod architecture feature, multiple pods can be joined together to form a single implementation called a pod federation. A pod federation can span multiple sites and datacenters and simultaneously simplify the administration effort required to manage a large-scale virtual machine deployment. For example, two previously standalone pods in different datacenters, for example one located in New York and one located in London, can be joined together to form a single pod federation. An end user in this environment can connect to a connection server instance in the New York datacenter and receive a session on a desktop in the London datacenter.

The system for collaborative access to virtual desktops described herein has certain advantages for connecting users out of different pods when a cloud pod architecture is implemented. For example, the session owner's desktop can be served out of one pod (e.g. a California pod) but a collaborator can connect to that desktop out of a different pod (e.g. New York pod) directly when a cloud pod architecture is implemented. This offer some more flexibility in terms of facilitating collaboration when a collaborating user wouldn't normally be able to route directly to the session owner's desktop.

Figure 5:
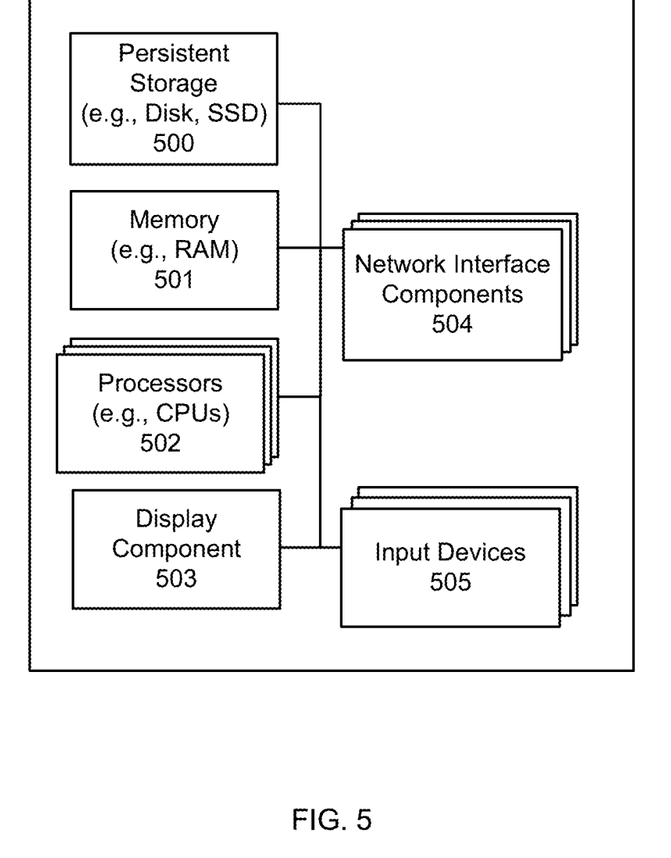
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for collaboratively accessing a virtual desktop produced by a virtual machine hosted on a server by two or more users, comprising:

establishing a remote desktop session for an owner of the virtual desktop by executing the virtual desktop on the server and connecting a virtual desktop client of the owner executing on a first remote client device to a virtual desktop agent executing in the virtual desktop, the virtual desktop client of the owner being configured to, using a remote desktop protocol, receive and display a GUI streamed to the virtual desktop client from the virtual desktop agent and to transmit user inputs produced on the virtual desktop client of the owner to the virtual desktop agent using the remote desktop protocol for being injected into and effectuated in the virtual desktop;

receiving a request to initiate a collaborative session on the virtual desktop with at least one specified collaborator;

conveying an invitation message to join the remote desktop session to the at least one collaborator, the invitation message including a link to the virtual desktop, the link being configured to route a virtual desktop client of the at least one collaborator that is executed on a client device of the at least one collaborator to the virtual desktop for connecting the virtual desktop client of the at least one collaborator to the virtual desktop;

in response to the invitation message, receiving a request from the virtual desktop client of the at least one collaborator to join the virtual desktop, the virtual desktop client of the at least one collaborator being configured to, using the remote desktop protocol, receive and display the GUI streamed to the virtual desktop client from the virtual desktop agent and to transmit user inputs produced on the virtual desktop client of the at least one collaborator to the virtual desktop agent using the remote desktop protocol for being injected into and effectuated in the virtual desktop;

joining the at least one collaborator to the remote desktop session by connecting the virtual desktop client of the at least one collaborator to the virtual desktop agent;

wherein, during the remote desktop session:

the virtual desktop agent streams the GUI of the virtual desktop to the virtual desktop client of the owner and to the virtual desktop client of the at least one collaborator;

one of the virtual desktop clients of the owner or the at least one collaborator is designated as having input control; and the virtual desktop agent receives inputs via the remote desktop protocol from each virtual desktop client connected to the virtual desktop of the owner and the at least one collaborator and determines which virtual desktop client's received inputs to permit into the virtual desktop based on which virtual desktop client has been designated as having input control while ignoring received inputs from remaining virtual desktop clients connected to the agent.

2. The method of claim 1, wherein:
at the start of the collaborative session, the owner has input control in the virtual desktop; and
the owner is able to grant input control to the at least one collaborator.

3. The method of claim 1, further comprising:
receiving inputs into the virtual desktop at the server from the owner's virtual desktop client and from the at least one collaborator's virtual desktop client; and
muting inputs conveyed to the virtual desktop from the at least one collaborator's virtual desktop client while permitting inputs from the owner's virtual desktop client.

4. The method of claim 3, further comprising:
receiving an instruction from the owner's virtual desktop client to grant input control to a particular collaborator and, in response to the instruction, muting subsequent inputs conveyed to the virtual desktop from the owner's or any other collaborator's virtual desktop clients, while permitting inputs from the particular collaborator's virtual desktop client.

5. The method of claim 1, further comprising:
generating a first encoder for streaming the GUI of the virtual desktop to the owner's virtual desktop client via the connection between the virtual desktop and the owner's virtual desktop client; and
generating a separate encoder for streaming the GUI of the virtual desktop to the at least one collaborator's virtual desktop client via the connection between the virtual desktop and the at least one collaborator's virtual desktop client.

6. The method of claim 5, further comprising:
joining at least two collaborators to the remote desktop session by connecting virtual desktop client, each virtual desktop client executing on a separate client device, of the at least two collaborators to the virtual desktop; and
generating an encoder shared by the virtual desktop client of the at least two collaborators for streaming the GUI of the virtual desktop to each of the virtual desktop client of the at least two collaborators via the corresponding connections between the virtual desktop and the virtual desktop client of the at least two collaborators.

7. The method of claim 1, wherein the virtual desktop agent presents an invitation user interface (UI) that gives the owner an option to invite participants and form a collaborative session on the virtual desktop, and wherein the request to initiate the collaborative session on the virtual desktop with the at least one specified collaborator is received via the invitation UI.

8. A computing device for collaboratively accessing a virtual desktop produced by a virtual machine hosted on a server by two or more users, comprising:
at least one processor; and
memory including instructions that, when executed by the at least one processor, cause the computing device to perform the steps of:
establishing a remote desktop session for an owner of the virtual desktop by executing the virtual desktop on the server and connecting a virtual desktop client of the owner executing on a first remote client device to a virtual desktop agent executing in the virtual desktop, the virtual desktop client of the owner being configured to, using a remote desktop protocol, receive and display a GUI streamed to the virtual desktop client from the virtual desktop agent and to transmit user inputs produced on the virtual desktop client of the owner to the virtual desktop agent using the remote desktop protocol for being injected into and effectuated in the virtual desktop;
receiving a request to initiate a collaborative session on the virtual desktop with at least one specified collaborator;
conveying an invitation message to join the remote desktop session to the at least one collaborator, the invitation message including a link to the virtual desktop, the link being configured to route a virtual desktop client of the at least one collaborator that is executed on a client device of the at least one collaborator to the virtual desktop for connecting the virtual desktop client of the at least one collaborator to the virtual desktop;
in response to the invitation message, receiving a request from the virtual desktop client of the at least one collaborator to join the virtual desktop, the virtual desktop client of the at least one collaborator being configured to, using the remote desktop protocol, receive and display the GUI streamed to the virtual desktop client from the virtual desktop agent and to transmit user inputs produced on the virtual desktop client of the at least one collaborator to the virtual desktop agent using the remote desktop protocol for being injected into and effectuated in the virtual desktop;
joining the at least one collaborator to the remote desktop session by connecting the virtual desktop client of the at least one collaborator to the virtual desktop agent;
wherein, during the remote desktop session:
the virtual desktop agent streams the GUI of the virtual desktop to the virtual desktop client of the owner and to the virtual desktop client of the at least one collaborator;
one of the virtual desktop clients of the owner or the at least one collaborator is designated as having input control; and
the virtual desktop agent receives inputs via the remote desktop protocol from each virtual desktop client connected to the virtual desktop of the owner and the at least one collaborator and determines which virtual desktop client's received inputs to permit into the virtual desktop based on which virtual desktop client has been designated as having input control while ignoring received inputs from remaining virtual desktop clients connected to the agent.

9. The computing device of claim 8, wherein
at the start of the collaborative session, the owner has input control in the virtual desktop; and
the owner is able to grant input control to the at least one collaborator.

10. The computing device of claim 8, wherein the memory further includes instructions that when executed by the at least one processor, cause the computing device to perform the steps of:
receiving inputs into the virtual desktop at the server from the owner's virtual desktop client and from the at least one collaborator's virtual desktop client; and
muting inputs conveyed to the virtual desktop from the at least one collaborator's virtual desktop client while permitting inputs from the owner's virtual desktop client.

11. The computing device of claim 10, wherein the memory further includes instructions that when executed by the at least one processor, cause the computing device to perform the steps of:
receiving an instruction from the owner's virtual desktop client to grant input control to a particular collaborator and, in response to the instruction, muting subsequent inputs conveyed to the virtual desktop from the owner's or any other collaborator's virtual desktop clients, while permitting inputs from the particular collaborator's virtual desktop client.

12. The computing device of claim 8, wherein the memory further includes instructions that when executed by the at least one processor, cause the computing device to perform the steps of:
generating a first encoder for streaming the GUI of the virtual desktop to the owner's virtual desktop client via the connection between the virtual desktop and the owner's virtual desktop client; and
generating a separate encoder for streaming the GUI of the virtual desktop to the at least one collaborator's virtual desktop client via the connection between the virtual desktop and the at least one collaborator's virtual desktop client.

13. The computing device of claim 12, wherein the memory further includes instructions that when executed by the at least one processor, cause the computing device to perform the steps of:
joining at least two collaborators to the remote desktop session by connecting virtual desktop client, each virtual desktop client executing on a separate client device, of the at least two collaborators to the virtual desktop; and
generating an encoder shared by the virtual desktop client of the at least two collaborators for streaming the GUI of the virtual desktop to each of the virtual desktop client of the at least two collaborators via the corresponding connections between the virtual desktop and the virtual desktop clients of the at least two collaborators.

14. The computing device of claim 8, wherein the virtual desktop agent presents an invitation user interface (UI) that gives the owner an option to invite participants and form a collaborative session on the virtual desktop, and wherein the request to initiate the collaborative session on the virtual desktop with the at least one specified collaborator is received via the invitation UI.

15. A non-transitory computer readable storage medium for collaboratively accessing a virtual desktop produced by a virtual machine hosted on a server by two or more users comprising one or more sequences of instructions, the instructions when executed by one or more processors causing the one or more processors to execute the operations of:
establishing a remote desktop session for an owner of the virtual desktop by executing the virtual desktop on the server and connecting a virtual desktop client of the owner executing on a first remote client device to a virtual desktop agent executing in the virtual desktop, the virtual desktop client of the owner being configured to, using a remote desktop protocol, receive and display a GUI streamed to the virtual desktop client from the virtual desktop agent and to transmit user inputs produced on the virtual desktop client of the owner to the virtual desktop agent using the remote desktop protocol for being injected into and effectuated in the virtual desktop;
receiving a request to initiate a collaborative session on the virtual desktop with at least one specified collaborator;
conveying an invitation message to join the remote desktop session to the at least one collaborator, the invitation message including a link to the virtual desktop, the link being configured to route a virtual desktop client of the at least one collaborator that is executed on a client device of the at least one collaborator to the virtual desktop for connecting the virtual desktop client of the at least one collaborator to the virtual desktop;
in response to the invitation message, receiving a request from the virtual desktop client of the at least one collaborator to join the virtual desktop, the virtual desktop client of the at least one collaborator being configured to, using the remote desktop protocol, receive and display the GUI streamed to the virtual desktop client from the virtual desktop agent and to transmit user inputs produced on the virtual desktop client of the at least one collaborator to the virtual desktop agent using the remote desktop protocol for being injected into and effectuated in the virtual desktop;
joining the at least one collaborator to the remote desktop session by connecting the virtual desktop client of the at least one collaborator to the virtual desktop agent;
wherein, during the remote desktop session:
the virtual desktop agent streams the GUI of the virtual desktop to the virtual desktop client of the owner and to the virtual desktop client of the at least one collaborator;
one of the virtual desktop clients of the owner or the at least one collaborator is designated as having input control; and
the virtual desktop agent receives inputs via the remote desktop protocol from each virtual desktop client connected to the virtual desktop of the owner and the at least one collaborator and determines which virtual desktop client's received inputs to permit into the virtual desktop based on which virtual desktop client has been designated as having input control while ignoring received inputs from remaining virtual desktop clients connected to the agent.

16. The non-transitory computer readable storage medium of claim 15, wherein
at the start of the collaborative session, the owner has input control in the virtual desktop; and
the owner is able to grant input control to the at least one collaborator.

17. The non-transitory computer readable storage medium of claim 15, further comprising instructions that when executed by the one or more processors cause the one or more processors to execute the operations of:
receiving inputs into the virtual desktop at the server from the owner's virtual desktop client and from the at least one collaborator's virtual desktop client; and muting inputs conveyed to the virtual desktop from the at least one collaborator's virtual desktop client while permitting inputs from the owner's virtual desktop client.

18. The non-transitory computer readable storage medium of claim 17, further comprising instructions that when executed by the one or more processors cause the one or more processors to execute the operations of:

receiving an instruction from the owner's virtual desktop client to grant input control to a particular collaborator and, in response to the instruction, muting subsequent inputs conveyed to the virtual desktop from the owner's or any other collaborator's virtual desktop clients, while permitting inputs from the particular collaborator's virtual desktop client.

19. The non-transitory computer readable storage medium of claim 15, further comprising instructions that when executed by the one or more processors cause the one or more processors to execute the operations of:

generating a first encoder for streaming the GUI of the virtual desktop to the owner's virtual desktop client via the connection between the virtual desktop and the owner's virtual desktop client; and generating a separate encoder for streaming the GUI of the virtual desktop to the at least one collaborator's virtual desktop client via the connection between the virtual desktop and the at least one collaborator's virtual desktop client.

20. The non-transitory computer readable storage medium of claim 15, wherein the virtual desktop agent presents an invitation user interface (UI) that gives the owner an option to invite participants and form a collaborative session on the virtual desktop, and wherein the request to initiate the collaborative session on the virtual desktop with the at least one specified collaborator is received via the invitation UI.

* * * * *